(12) United States Patent
Donzier et al.

(10) Patent No.: US 10,774,639 B2
(45) Date of Patent: Sep. 15, 2020

(54) DOWNHOLE LOCAL SOLID PARTICLES COUNTING PROBE, PRODUCTION LOGGING TOOL COMPRISING THE SAME AND SAND ENTRY INVESTIGATION METHOD FOR HYDROCARBON WELLS

(71) Applicant: Openfield SA, Versailles (FR)

(72) Inventors: Eric Donzier, Berchères sur Vesgre (FR); Linda Abbassi, Katy, TX (US); Emmanuel Tavernier, Paris (FR)

(73) Assignee: OPENFIELD, Versailles (FR)

( * ) Notice: Subject to any disclaimer, the term of this patent is extended or adjusted under 35 U.S.C. 154(b) by 218 days.

(21) Appl. No.: 16/019,570

(22) Filed: Jun. 27, 2018

(65) Prior Publication Data

US 2019/0003303 A1 Jan. 3, 2019

(30) Foreign Application Priority Data

Jun. 29, 2017 (EP) ........................................ 7305820

(51) Int. Cl.
*G01V 9/00* (2006.01)
*G01N 15/02* (2006.01)
(Continued)

(52) U.S. Cl.
CPC .......... *E21B 49/08* (2013.01); *E21B 17/1021* (2013.01); *E21B 17/1078* (2013.01);
(Continued)

(58) Field of Classification Search
CPC ................... G01N 15/02; G01N 15/06; G01N 2015/1062; G01N 2015/1087; G01N 29/04; G01N 29/14; G01N 29/032; G01V 9/007
See application file for complete search history.

(56) References Cited

U.S. PATENT DOCUMENTS 3,844,174 A * 10/1974 Chabre .................. G01N 15/06
73/865.5
4,030,175 A 6/1977 McShane
(Continued)

FOREIGN PATENT DOCUMENTS

EP 3118656 A1 1/2017

OTHER PUBLICATIONS

EP17305820, European Search Report, dated Jan. 3, 2018, Munich, Germany.

*Primary Examiner* — Kenneth L Thompson
(74) *Attorney, Agent, or Firm* — The Jansson Firm; Pehr B. Jansson (57) ABSTRACT

A downhole local solid particles counting probe (1) for counting solid particles (101) in a fluid (100) present in a hydrocarbon well in production comprising:
an elongated and flexible protective tube (2) defining an internal cavity (5) terminating by a membrane wall (3) defining a tip (4), the protective tube (2) and the membrane wall (3) isolating the internal cavity (5) from the fluid (100) of the hydrocarbon well, the protective tube (2) and membrane wall (3) are made of metal or metal alloy and have a thickness (ei) such as to resist to the downhole hydrocarbon well pressure;
a passive acoustic sensor (6) mounted inside the internal cavity (5), the passive acoustic sensor (6) having a front side (7) mechanically coupled on the membrane wall (3) of the tip (4);
a characteristic dimension of the passive acoustic sensor (6) is similar to solid particles (101) average characteristic dimension, ranging from 0.5 mm to 1.5 mm, and a characteristic dimension of the membrane wall (3) defining the tip (4) ranges from 1 mm to 2 mm; and
the passive acoustic sensor (6) is arranged to detect acoustic waves (30) generated by solid particles (101)
(Continued)

impacting the membrane wall (3) defining the tip (4) so as to resolve an individual impact from a single solid particle and to produce a signal representative of a count of solid particles.

11 Claims, 4 Drawing Sheets

(51) Int. Cl.
| | | |
|---|---|---|
| *G01N 29/14* | (2006.01) | |
| *E21B 49/08* | (2006.01) | |
| *E21B 17/10* | (2006.01) | |
| *G01N 15/10* | (2006.01) | |
| *G01H 11/08* | (2006.01) | |
| *E21B 47/017* | (2012.01) | |
| *E21B 47/085* | (2012.01) | |
| *E21B 47/107* | (2012.01) | |
| *G01N 15/00* | (2006.01) | |
| *G01V 1/44* | (2006.01) | |
| *G01V 1/16* | (2006.01) | |
| *G01V 1/52* | (2006.01) | |

(52) U.S. Cl.
CPC .......... *E21B 47/017* (2020.05); *E21B 47/085* (2020.05); *E21B 47/107* (2020.05); *G01H 11/08* (2013.01); *G01N 15/10* (2013.01); *G01V 9/00* (2013.01); *G01N 2015/0053* (2013.01); *G01N 2015/1062* (2013.01); *G01V 1/162* (2013.01); *G01V 1/166* (2013.01); *G01V 1/44* (2013.01); *G01V 1/52* (2013.01)

(56) References Cited

U.S. PATENT DOCUMENTS

| | | | | |
|---|---|---|---|---|
| 4,073,193 | A * | 2/1978 | Mastandrea | G01N 29/2437 |
| | | | | 73/865.5 |
| 4,131,815 | A | 12/1978 | Boatright | |
| 5,681,986 | A * | 10/1997 | Merk | G01N 15/06 |
| | | | | 310/337 |
| 7,673,526 | B2 * | 3/2010 | Bailey | G01F 1/666 |
| | | | | 73/861.26 |
| 7,878,047 | B2 * | 2/2011 | Hemblade | G01N 29/222 |
| | | | | 73/61.75 |
| 9,170,240 | B2 * | 10/2015 | Lin | G01N 15/02 |
| 2018/0120865 | A1 * | 5/2018 | Nuryaningsih | G01H 11/02 |
| 2019/0277806 | A1 * | 9/2019 | Huang | E21B 47/101 |

* cited by examiner

DOWNHOLE LOCAL SOLID PARTICLES COUNTING PROBE, PRODUCTION LOGGING TOOL COMPRISING THE SAME AND SAND ENTRY INVESTIGATION METHOD FOR HYDROCARBON WELLS

TECHNICAL FIELD

The invention relates to a downhole solid particles counting probe and a production logging tool comprising one or a plurality of such a probe. The invention is particularly applicable to the counting of solid particles in a multiphase fluid mixture flowing from a hydrocarbon bearing zone into a hydrocarbon well by means of said production logging tool that operates at downhole pressure and temperature conditions. The invention is particularly applicable in harsh downhole environment including high temperature (up to 200° C.), high pressure (up to 2.000 bars), corrosive fluid and wherein solid particles are sand grains. The production logging tool is used to investigate sand entries in a hydrocarbon well.

BACKGROUND

During the production of gas and/or oil by a hydrocarbon well, the multiphase fluid mixture stream that flows through the perforations of the casing made facing a hydrocarbon bearing zone is often laden with solid particles. Such solid particles include sand grains, silts, clays and other subterranean formation materials. The solid particles are dragged from the formation layers by the fluid flow and carried by the fluid flow into the well towards the surface. These solid particles may damage the production equipments, either by their erosive actions, or by settling down in parts of the production equipment, thus causing well plugging, pipes erosion, and severe contamination of the production equipments. These may require regular cleaning of the production equipment during which hydrocarbon production is stopped. All these detrimental effects of the solid particles onto the production are costly. Thus, there is a need to monitor the fluid flow and to identify the zones responsible of solid particles entries into the well in order to allow operators to take the necessary steps when excessive amounts of solid particles are found to be present in the fluid flow. Implementing corrective actions may include the installation of sand screens or even closing the responsible zones with patches.

Various methods of investigating a hydrocarbon well to determine solid particles, in particular sand entry from a subterranean hydrocarbon-bearing formation into the well are known in the art.

The documents U.S. Pat. Nos. 3,509,764, 3,563,311, and 4,315,428 describe standalone well tools performing acoustic measurements.

The document U.S. Pat. No. 3,509,764 describes a method of investigating a cased well including a tubing string extending through a producing zone. The method consists in positioning a sound detector inside the tubing string adjacent the zone and monitoring the sound created by the impingement of the well production stream from the producing zone on the exterior of the tubing string. The possible clogging of perforations, resulting in excessive flow velocity of the well stream through unclogged perforations and consequent abrasion of the tubing string, can be detected. The method is only sensitive to indirect impacts on the tubing.

The document U.S. Pat. No. 3,563,311 describes a method of investigating a well penetrating a fluid-bearing formation with a sound detector. The well is produced at a plurality of flow rates under conditions such that fluid flowing from the formation impinges against an interface within the well. The sound produced by the impingement of this fluid is monitored by the sound detector at each flow rate. From the information thus obtained, the flow rate and location at which sand is produced from the formation may be determined. The detector is only sensitive to indirect impacts on the tubing.

The document U.S. Pat. No. 4,315,428 describes a sensor for detecting sand grains in a fluid flow. The sensor comprises a ring-shaped member carrying an acoustic transducer. The ring-shaped member is supported on a rod by clamping means, and material having elastic properties is arranged on the surfaces of the ring-shaped member that contact the rod or the clamping means. The sensor is disposed in the well and only exposed to transversal impacts.

The documents US 2007/047867 and U.S. Pat. No. 4,240,287 describe other techniques relying on sensors positioned outside or across the pipe in which the fluid flows.

The document US 2007/047867 describes a downhole fiber optic acoustic sand detector. An array of fiber optic acoustic sensors (Bragg gratings) is formed within an optical fiber. The array of acoustic sensors may be deployed to a well bore for detecting acoustic signals occurring within the production area of the well bore, such as acoustic signals resulting from sand invading the well bore. A plurality of acoustic sensors may be formed by forming a plurality of periodic refractive index perturbations at selected intervals within the acoustic sensing section of the optical fiber. The fiber optic acoustic sensor may be deployed in the well or may be unobtrusively mounted on the exterior of a well casing.

The document U.S. Pat. No. 4,240,287 describes a method and apparatus for detecting sand particles in a flowing fluid, e.g. the production from a gas or oil well. An acoustic transducer is used to detect the sand particles and the resulting signal is filtered to pass a frequency band of 50 to 500 kilohertz. A pulse height discriminating means and pulse counter is provided for counting the number of pulses that exceed a pre-set amplitude.

The drawbacks of such conventional solutions are that an accurate quantitative evaluation of sand production/entry requires complex data treatment and relies on transducer sensitivity calibration that may not be accurate, and/or may drift, and/or may be dependent on temperature variation.

SUMMARY OF THE DISCLOSURE

It is an object of the invention to propose a downhole solid particles counting probe that overcomes one or more of the limitations or drawbacks of the existing sand detectors. It is another object of the invention to propose a downhole solid particles investigation method that overcomes one or more of the limitations or drawbacks of the existing sand entry investigation method. It is still another object of the invention to propose a production logging tool comprising a plurality of angularly distributed downhole solid particles counting probes that may locate sand entry into hydrocarbon wells in an efficient manner.

According to one aspect, there is provided a downhole local solid particles counting probe for counting solid particles in a fluid present in a hydrocarbon well in production comprising:

an elongated and flexible protective tube defining an internal cavity terminating by a membrane wall defining a tip, the protective tube and the membrane wall isolating the internal cavity from the fluid of the hydrocarbon well, the protective tube and membrane wall are made of metal or metal alloy and have a thickness such as to resist to a downhole hydrocarbon well pressure;

a passive acoustic sensor mounted inside the internal cavity, the passive acoustic sensor having a front side mechanically coupled on the membrane wall of the tip;

a characteristic dimension of the passive acoustic sensor is similar to solid particles average characteristic dimension, ranging from 0.5 mm to 1.5 mm, and a characteristic dimension of the membrane wall defining the tip ranges from 1 mm to 2 mm; and the passive acoustic sensor is arranged to detect acoustic waves generated by solid particles impacting the membrane wall defining the tip so as to resolve an individual impact from a single solid particle and to produce a signal representative of a count of solid particles.

The internal cavity may be under a pressure ranging from 0 to 4 atm.

The passive acoustic sensor may have a disk shape, and the protective tube, internal cavity and membrane wall may have a cylindrical shape.

The passive acoustic sensor may be a piezoelectric ceramic.

The protective tube and the membrane wall may be made of austenite nickel-chromium-based super-alloys.

The piezoelectric ceramic may comprise metallization layers on the front and back sides.

The piezoelectric ceramic may be coupled to the membrane wall by a coupling means chosen in the group comprising conductive glue, brazing, silver glass frit or eutectic bonding.

The back side of the piezoelectric ceramic may be connected to a control circuit by wire bonding, and a front side of the piezoelectric ceramic coupled to the membrane wall of the protective tube may be connected to the ground.

According to a further aspect, there is provided a downhole production logging tool used to count solid particles in a fluid present in a hydrocarbon well, the tool being adapted for displacement along and within the hydrocarbon well and comprising multiple downhole local solid particles counting probes in accordance with the invention, wherein said probes are angularly distributed as an array around a cylindrical housing.

The tool may further comprise a centralizer having multiple deploying arms, at least a part of the multiple deploying arms being fitted with said downhole local solid particles counting probes, the elongated and flexible protective tube being mounted on at least one deploying arm of the centralizer such as to follow movements of the centralizer.

According to still a further aspect, there is provided a method of investigating sand entry in a hydrocarbon well in production to identify zones of the hydrocarbon well responsible for sand entry by moving the downhole logging tool in accordance with the invention along the hydrocarbon well within the fluid using a wireline or a slick line and counting a number of sand grains impacting any of the probes over a defined threshold, said threshold being related to sand entry, and positioning a corresponding zone of the hydrocarbon well responsible for sand entry.

With the invention applicable to solid particles being sand grains, the typical dimensions of the ultrasonic sensor are comparable to the sand grains characteristic dimension which greatly eases signal interpretation. Thus, even if many sand grains impact the sensing surface of the membrane at the same time, the individual contributions can be extracted from signal. The accurate quantitative evaluation of sand production is based on simple data treatment and does not rely on sensor sensitivity calibration (thus being insensitive to drift and temperature variation).

The probe of the invention, when incorporated into a logging tool, enables identifying the location of the sand entry into the well.

Sand grains have a high density compared to petroleum fluids. Thus, sand grains transported by the multiphase fluid mixture stream tend to fall at the bottom of the pipe in horizontal and deviated wells. Compared to single sensor based investigating methods that may miss the sand entry, a production logging tool comprising a plurality of probe of the invention is efficient to detect the location of the sand entry into the well.

With the invention, it is possible to operate the downhole local solid particles counting probe under extreme pressures, temperatures, shocks and corrosive environments while keeping excellent sensitivity performance.

Other advantages will become apparent from the hereinafter description of the invention.

BRIEF DESCRIPTION OF THE DRAWINGS

The present invention is illustrated by way of examples and not limited to the accompanying drawings, in which like references indicate similar elements.

DETAILED DESCRIPTION

The invention will be understood from the following description, in which reference is made to the accompanying drawings.

Figure 1:
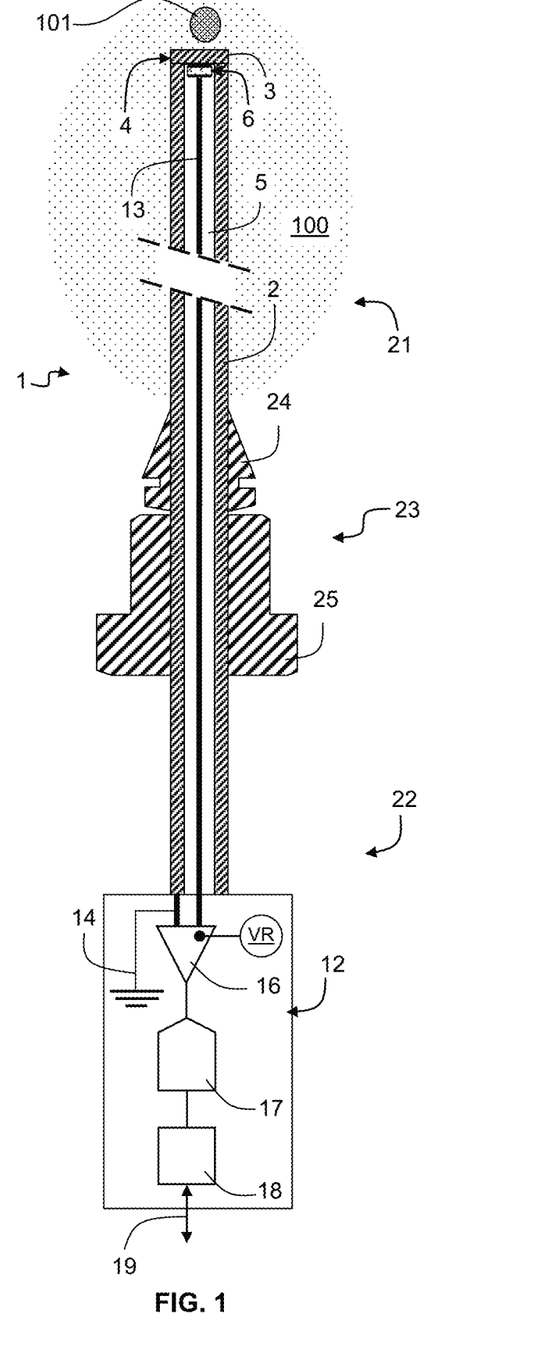
FIG. 1 is a partial cross-section view, showing an exemplary embodiment of a downhole solid particles counting probe.
Figure 2:
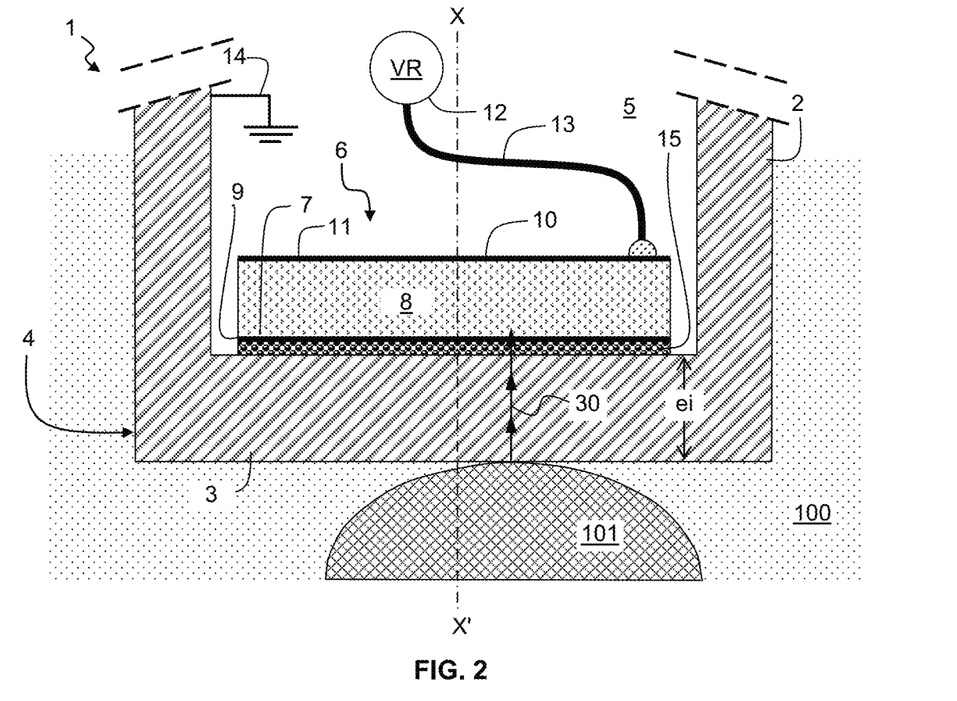
FIG. 2 is an enlarged view schematically illustrating a tip of the downhole solid particles counting probe of FIG. 1.
Figure 3:
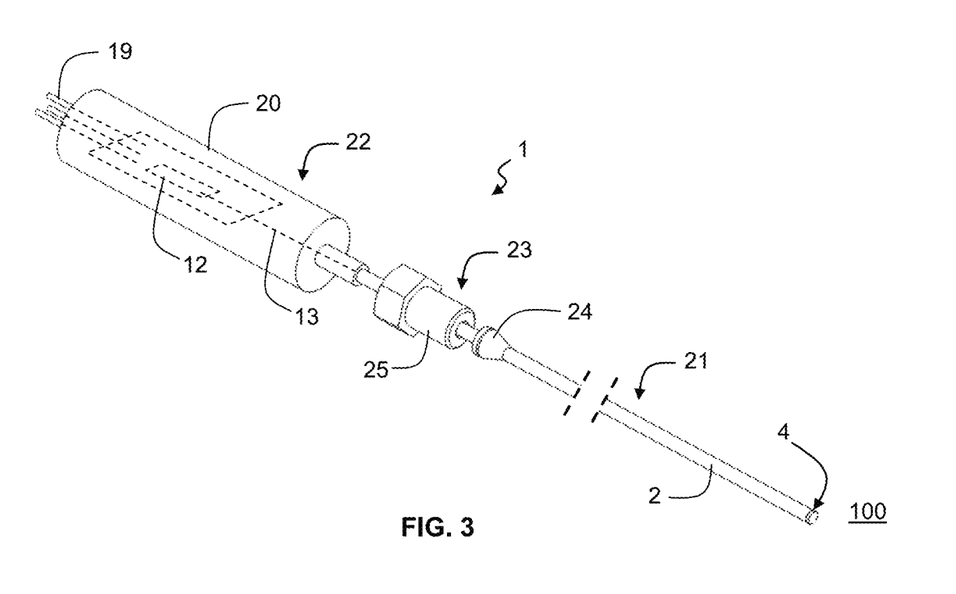
FIG. 3 is a perspective view showing the exemplary embodiment of FIG. 1.

FIG. 1 is a partial cross-section view, showing an exemplary embodiment of a downhole solid particles counting probe. FIG. 2 is an enlarged view schematically illustrating a tip of the downhole solid particles counting probe of FIG. 1. FIG. 3 is a perspective view showing such an exemplary embodiment.

The downhole local solid particles counting probe 1 comprises an elongated and flexible protective tube 2. The elongated and flexible protective tube 2 terminates by a membrane wall 3 defining a tip 4. The membrane wall 3 may be substantially flat. Thus, the elongated and flexible protective tube 2 together with the membrane wall 3 defines an internal cavity 5. Said tube 2 and membrane wall 3 isolate the internal cavity 5 from the external environment, namely the fluid of the hydrocarbon well 100.

In the following description, the external environment 100 is intended to mean the harsh downhole environment including high temperature (up to 200° C.), high pressure (up to 2.000 bars) and corrosive fluid wherein the probe may be deployed.

The internal cavity 5 may be under vacuum (e.g. low or medium vacuum in the range of $1\text{-}10^{-3}$ bar) or at a low pressure ranging from 0 to 4 atm, while the downhole pressure outside said probe may be up to 2.000 bars. Thus, the pressure in the cavity 5 is unrelated to the downhole pressure within the hydrocarbon well. Said tube 2 and membrane wall 3 are made of metal or metal alloy and have a thickness such as to resist to the downhole hydrocarbon well pressure. As examples, they can be made of stainless steel or austenite nickel-chromium-based super-alloys, commercialized by Special Metals Corp./Precision Castparts Corp. under the trademark Inconel. These elements can be made of Inconel 718 having well defined composition and properties. The protective tube 2 and the membrane wall 3 may be manufactured in the same metal or alloy piece, the membrane wall 3 being then integrally formed with the protective tube 2.

A characteristic dimension of the acoustic sensor 6 is similar to solid particles 101 average characteristic dimension. The characteristic dimension is understood to be either the diameter for an element having a circular section, or a side length for an element having a square or rectangular section. The sensitive surface of the acoustic sensor 6 is similar to the solid particles 101 apparent surface when impacting the tip 4. The characteristic dimension of the tip 4 must not disturb, at least in a minimum manner, the fluid flow. In the present embodiment, the acoustic sensor 6 is a disk, while the protective tube 2 ending by the membrane wall 3 are cylindrical. As an example, the diameter of the acoustic sensor 6 ranges from around 0.5 mm to 1.5 mm, and the diameter of the membrane wall 3 defining the tip 4 ranges from around 1.0 mm to 2.0 mm. The protective tube 2 may have a length ranging from a few centimeters (e.g. 5 cm) to several tens of centimeters (e.g. 60 cm). The downhole local solid particles counting probe 1 further comprises an acoustic sensor 6 mounted inside the internal cavity 5. The acoustic sensor 6 has a front side 7 mechanically coupled on the membrane wall 3 of the tip 4. The acoustic sensor 6 is arranged to detect acoustic waves generated by solid particles 101 impacting the membrane wall 3. Thus, the probe tip 4 is made sensitive to solid particles impacts. As an example, the acoustic sensor 6 is a piezoelectric ceramic 8.

In the present example, the downhole local solid particles counting probe 1 has a general cylindrical shape of longitudinal symmetry axis XX'. The acoustic sensor 6 under the form of the piezoelectric ceramic 8 has a disk shape. The protective tube 2 and membrane wall 3, and the internal cavity 5 have a cylindrical shape. The membrane wall 3 and the disk shaped piezoelectric ceramic 8 extend perpendicularly to the longitudinal symmetry axis XX'.

The piezoelectric ceramic 8 may be a Lead Zirconate Titanate piezoceramic disk having a thickness ranging from 0.1 mm to 1 mm and a diameter ranging from around 0.5 mm to 1.5 mm. For example, the piezoelectric ceramic 8 is a PZT disk made of PZ27 from Meggitt-Feroperm with a thickness of 0.25 mm and a diameter of 1.0 mm. The piezoelectric ceramic 8 comprises metallization layers 9, 10 (e.g. gold, silver or other metal) on the front and back sides 7, 11, respectively. The piezoelectric ceramic 8 may be mechanically coupled to the membrane wall 3 by a conductive glue 15, or by brazing, or by silver glass frit, or by eutectic bonding. The metallization layer 10 of the back side 11 of the piezoelectric ceramic 8 forms an electrode connected to a control circuit 12 by wire bonding (e.g. gold wire bonding) and a wire 13 extending inside the protective tube 2. The front side 7 of the piezoelectric ceramic 8 is connected to the ground 14 via the membrane wall 3 and the protective tube 2.

The piezoelectric ceramic 8 counts solid particles by detecting ultrasonic waves 30 generated by solid particles 101 impacting the membrane wall 3 and by converting said detected ultrasonic waves into electrical signal VR. The piezoelectric ceramic 8 is passive and operated as a receiver of ultrasonic waves (ultrasonic waves travel only one way from the tip towards the piezoelectric ceramic). In general, ultrasonic waves or ultrasound are acoustic waves having frequencies ranging from 20 kHz up to several gigahertz. The ultrasonic waves 30 generated by solid particles 101 impacting the membrane wall 3 have frequencies around the MHz. In order to perform a good measurement, the resonance frequency of the piezoelectric ceramic 8 is advantageously selected to be higher than the frequencies of the acoustic waves created by the shock of the solid particles 101. This leads to a resonance frequency of a few MHz or a few tens of MHz. The piezoelectric ceramic 8 counts pulses of ultrasonic waves generated from the solid particles 101 impacting the membrane wall 3 from the external environment 100 through the membrane wall 3 and generates an electrical reception signal VR. As an example, the control circuit 12 measures reception signals having amplitudes ranging from a few micro-Volts to several hundreds milli-Volts. Taking into consideration the dimension of the probe tip and piezoelectric ceramic, each received ultrasonic energy/pulse which has travelled through the membrane wall may be related to a single or individual solid particle having impacted the tip.

The control circuit 12 is realized under the form of an electronic board comprising an amplifier 16, an analog-to-digital converter 17, a microcontroller 18 and output cables 19. The control circuit 12 amplifies the electrical signal VR generated by the piezoelectric ceramic 8, converts it into a digital signal and counts impacts from sand grains transported in the well flow. The microcontroller 18 can be used to perform such computation achieving measurement analysis so as to deliver digital measurements (e.g. number of impacts per a defined period of time) on the output cables 19. Then, data are communicated to the master controller of the production logging tool that will be described hereinafter using the output cables 19 forming a bus. The control circuit 12 may be placed inside a protective housing 20 that is installed in a part of the production logging tool that is sealed and protected against well fluids of the external environment 100.

The thickness ei of the membrane wall 3 is chosen such that the solid particles impact is well transmitted through the membrane, and such that the tip is able to withstand the high pressure applied by the external environment 100. This determines an appropriate minimum thickness ei of the membrane wall 3. Below this appropriate minimum thickness, the pressure induced mechanical stress would damage the piezoelectric ceramic 8. In addition, such thickness and the other features of the membrane wall are such as to provide an effective protection of the piezoelectric ceramic 8 at the highest pressure which can be expected in the external environment 100. The membrane wall 3 thickness is such that the strain level on the piezoelectric ceramic 8 stays below an elastic limit of the piezoelectric ceramic 8 under maximum operating pressure, e.g. 2.000 bars. This elastic limit corresponds to a maximum operating pressure causing defects inside the piezoelectric ceramic 8. With a thickness ei around 0.25 mm, a suitable protection of the piezoelectric ceramic 8 can be achieved. Similarly, the thickness of the protective tube 2 is around 0.25 mm.

The downhole local solid particles counting probe 1 has a first portion 21 in contact with the external environment 100 to be analyzed (i.e. in contact with harsh environments), and a second portion 22 separated from the external environment 100. A probe connector 23 separates the first portion 21 from the second portion 22. The probe connector 23 may be formed as a high pressure feedthrough. The first portion 21 is the one comprising the acoustic sensor 6. The second portion 22 is the one comprising the electronic board including the control circuit 12. The protective tube 2 and the membrane 3 are water-tight in order to avoid penetration of fluid towards the cavity 5 and the electronic board. In this exemplary embodiment, the probe connector 23 may slide onto the protective tube 2 and is sealed against the protective tube 2 once in place. The probe connector 23 is adapted to be connected to a conical shaped hole of a pipe, or into the housing of a tool. A tight connection may be achieved through a conical synthetic rubber/fluoropolymer elastomer ferrule 24 (metal-elastomer seal), or a conical metal ferrules 24 (metal-metal seal). For example, synthetic rubber/fluoropolymer elastomer may be Viton fluoroelastomers a registered trademark of DuPont Performance Elastomers L.L.C. A high pressure seal connection is obtained when the screw 25 associated with the conical ferrule 24 both slidingly coupled to the protective tube 2 is appropriately screwed into a threaded hole of a tool. Other waterproof and high pressure connections may be appropriate, for example a screw nut connection including an O-ring. As a further alternative the connection may be a welded connection to a hole in the pipe or into the housing of the tool.

Figure 4:
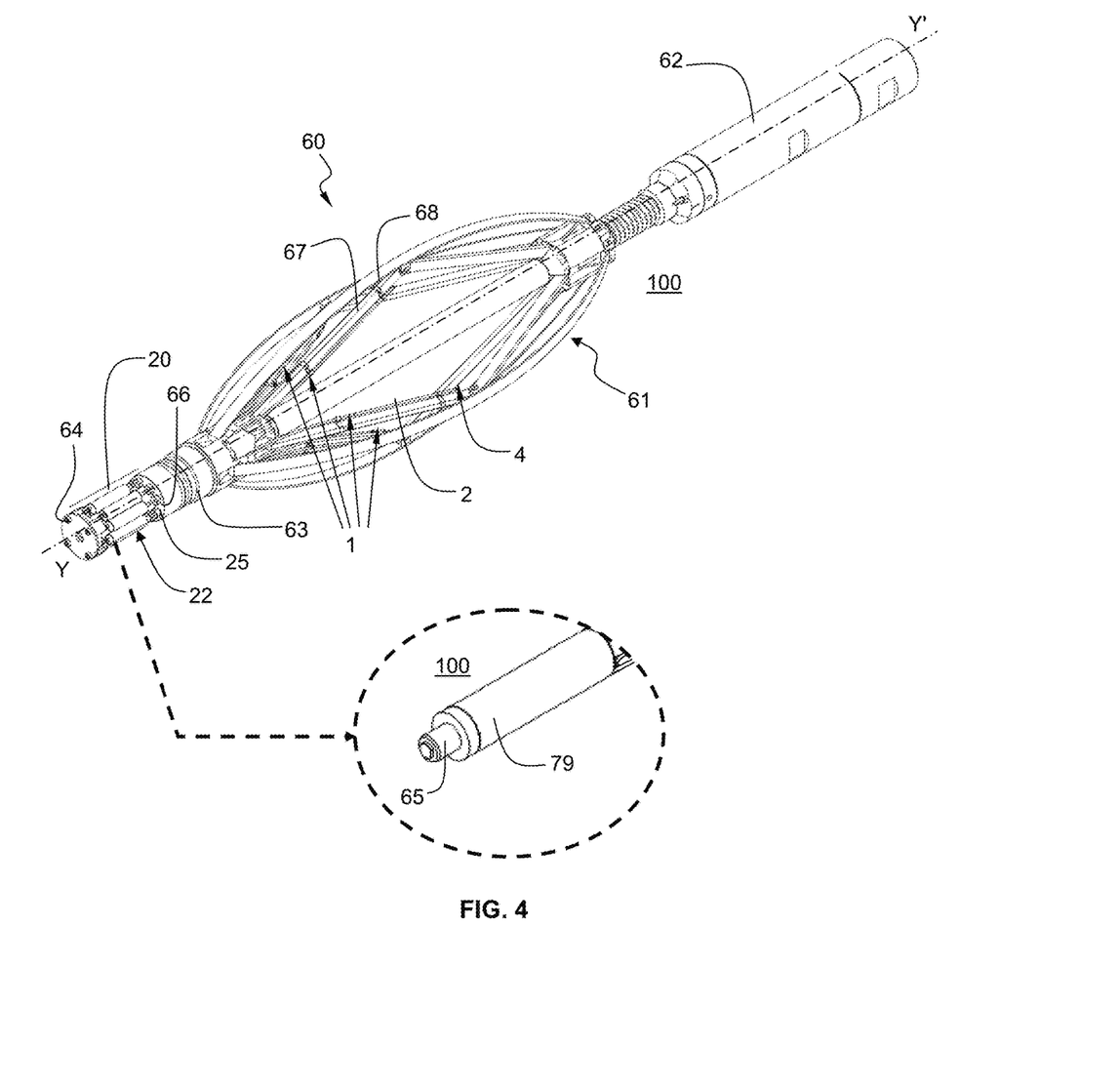
FIG. 4 is a perspective, partially transparent, view illustrating multiple downhole solid particles counting probes of FIGS. 1-3 assembled in a production logging tool.

FIG. 4 schematically illustrates in perspective, partially transparent, a production logging tool 60 comprising multiple downhole local solid particles counting probe 1. The production logging tool 60 comprises a centralizer section 61 having multiple arms 67 of a bow-spring assembly arranged to position the tool with respect to a pipe wall (e.g. cased hole, casing, or production pipe, etc. . . . ), an electronic/battery sub 62 connected to the centralizer section 61 on one side, and a probes housing section 63 connected to the centralizer section 61 on another side. The production logging tool 60 may comprise various other sections having different functionalities and connectors 65 as it is usual in the field of production logging tools. The production logging tool 60 may be coupled to surface equipments through a wireline 69 that are well known in the oilfield industry, thus not shown and described in details herein. The order of these elements along the tool is only an example as other positioning is possible. Each protective housing 20 of each downhole local solid particles counting probe 1 is received in the probes housing section 63. The probes housing section 63 is depicted as partially opened in FIG. 4 for ease of comprehension, though in practice a housing 79 further covers and protects the second section 22 from the external environment 100 (this is illustrated in a bottom detailed view and in FIG. 5). Each probe is connected to a tool master control circuit, the tool housing constituting a ground for the tool master control circuit 64 and all the probes 1. Each screw 25 is appropriately screwed into a threaded hole 66 of the probes housing section 63. Each protective tube 2 crosses through the probes housing section 63 towards the centralizer section 61. Thus, the high pressure feedthrough 23 made on the protective tube 2, for example using a screw/nut metal/metal seal, allows the downhole local solid particles counting probe 1 to be inserted within the flow of the multiphase fluid mixture. Each protective tube 2 is mechanically mounted to a corresponding deploying arm 67 of the centralizer 61 through an appropriate guiding piece 68 under the form of a ring or collar guiding and maintaining the protective tube 2 along the deploying arm 67. The deploying arms 67 of the centralizer 61 are used to position the downhole local solid particles counting probe 1 within the hydrocarbon well 70 as better described in relation with FIG. 5. A plurality of probes can be placed in the flow, advantageously around the well bore section in order to cover the full section of the well 70. Therefore, each acoustic sensor 6 positioned at the tip 4 of each downhole local solid particles counting probe 1 is deployed around the longitudinal axis YY' of the tool forming an angularly distributed array of downhole local solid particles counting probes 1.

Figure 5:
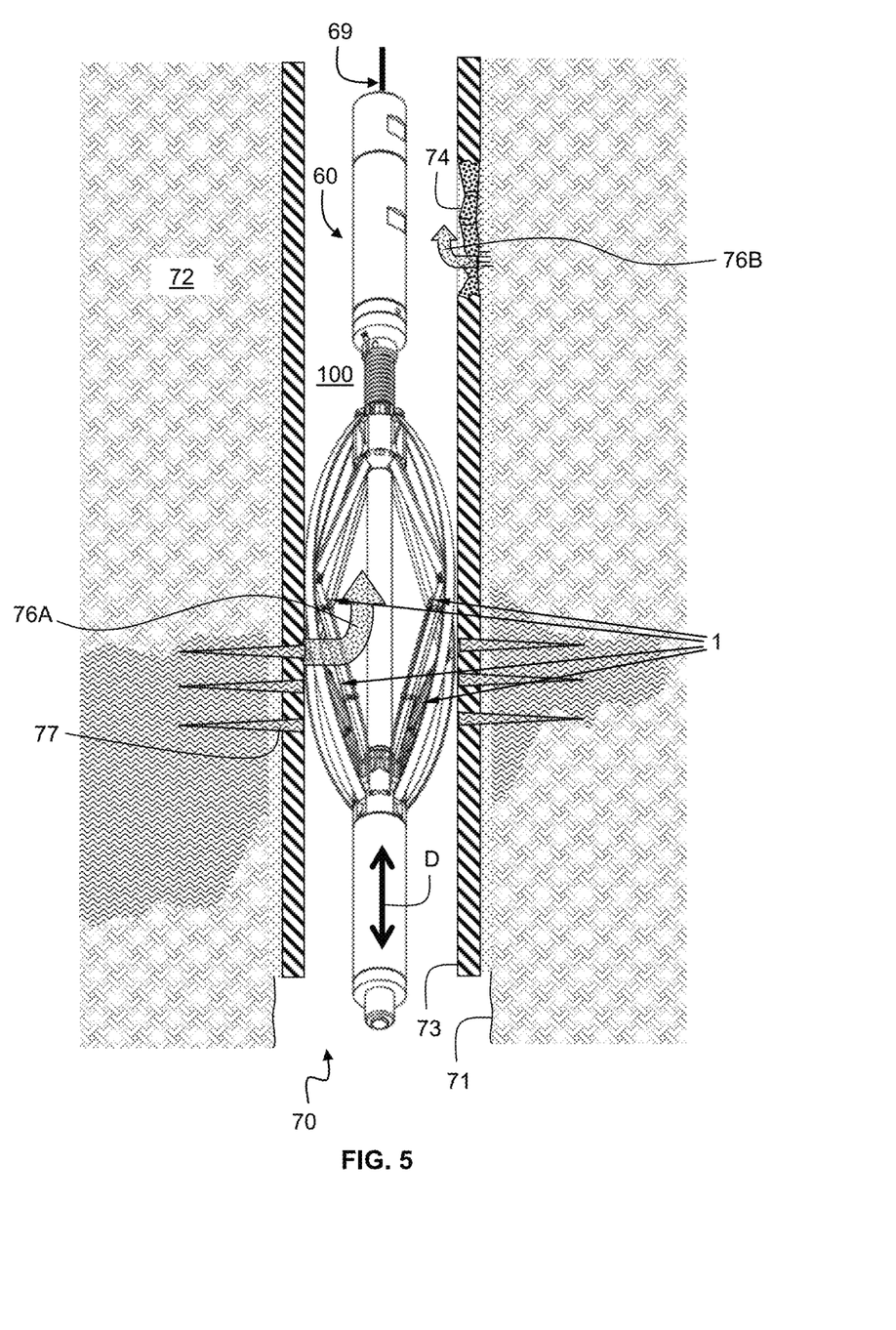
FIG. 5 is a partial cross section view illustrating the production logging tool of FIG. 4 performing sand entry measurements in a cased borehole of a hydrocarbon well drilled into a subterranean formation.

FIG. 5 is a perspective view schematically illustrating the production logging tool 60 deployed along portions 71, 73, 74 of the hydrocarbon well. In this application, the flexibility of the tube shaped tip (protective tube 2 terminating by the membrane 3 having inside a acoustic sensor 6) enables being deformed to follow the movements of centralizer along portions 71, 73, 74 of the hydrocarbon well 70. Therefore, with the downhole local solid particles counting probe 1 having a flexible protective tube shaped tip and miniaturized design, it is possible to perform individual impact measurements at places difficult to reach without generating disturbance into the fluid flow. Indeed, with the downhole local solid particles counting probe 1, it is possible to position the acoustic sensor 6 in close proximity to the pipe wall (casing) and displacing them along with the centralizer movement in the well.

The acoustic measurements may be continuously performed while the production logging tool 60 is displaced D along and within a well bore of the hydrocarbon well drilled into a subterranean formation 72 using a wireline or a slick line 69. The well bore may comprise uncased portion 71, cased portions 73, perforated portions 77, and corroded portions 74. Therefore, the production logging tool 60 can be used to detect solid particles entries, in particular sand entries 76A, 76B because each downhole local solid particles counting probe 1 is able to resolve each individual impact from each single solid particle. The production logging tool 60 counts a number of sand grains impacting any of the probes 1. When the number of impacts is over a defined threshold, the position of a solid particles entry is determined with a high probability.

The embodiments of the downhole local solid particles counting probe have the following advantages over the known solutions:

- A simple compact miniaturized design having high impacts counting performance, low power requirements and low manufacturing cost;
- It is well adapted for downhole oil and gas well applications (that implies harsh environment as above described);
- It is well adapted to count individual sand grain impacts; and
- It can be easily integrated in various downhole tool for various application, e.g. logging application, production monitoring application, etc.

The drawings and their description hereinbefore illustrate rather than limit the invention.

It should be appreciated that embodiments of the present invention are adapted to wells having any deviation with respect to the vertical. In the frame of the oilfield industry, in particular during production operations, all the embodiments of the present invention are equally applicable to cased and uncased borehole (open hole), and also other kind of downhole conduits or downhole device where a fluid may flow. Furthermore, the fluid may be flowing or at rest/static in the conduit. Furthermore, while the embodiments have been shown wherein the downhole local solid particles counting probes are directed according to particular direction with respect to the well or the pipe, these are only non-limitative example as other angles (e.g. 0°, 30°, 45°, 90°, etc. . . . ) may be more suitable in order to perform specific sand entries measurements.

The invention claimed is:

1. A downhole local solid particles counting probe for counting solid particles in a fluid present in a hydrocarbon well in production comprising:

an elongated and flexible protective tube defining an internal cavity terminating by a membrane wall defining a tip, the protective tube and the membrane wall isolating the internal cavity from the fluid of the hydrocarbon well, the protective tube and membrane wall are made of metal or metal alloy and have a thickness such as to resist to a downhole hydrocarbon well pressure;

a passive acoustic sensor mounted inside the internal cavity, the passive acoustic sensor having a front side mechanically coupled on the membrane wall of the tip;

wherein:

a characteristic dimension of the passive acoustic sensor is similar to solid particles average characteristic dimension, ranging from 0.5 mm to 1.5 mm, and a characteristic dimension of the membrane wall defining the tip ranges from 1 mm to 2 mm;

the passive acoustic sensor is arranged to detect acoustic waves generated by solid particles impacting the membrane wall defining the tip so as to resolve an individual impact from a single solid particle and to produce a signal representative of a count of solid particles.

2. The probe of claim 1, wherein the internal cavity is under a pressure ranging from 0 to 4 atm.

3. The probe according to claim 1, wherein the passive acoustic sensor has a disk shape, and the protective tube, internal cavity and membrane wall have a cylindrical shape.

4. The probe according to claim 1, wherein the protective tube and the membrane wall are made of austenite nickel-chromium-based super-alloys.

5. The probe according to claim 1, wherein the passive acoustic sensor is a piezoelectric ceramic.

6. The probe according to claim 5, wherein the piezoelectric ceramic comprises metallization layers on the front and back sides.

7. The probe according to claim 5, wherein the piezoelectric ceramic is coupled to the membrane wall by a coupling means chosen in the group comprising conductive glue, brazing, silver glass frit or eutectic bonding.

8. The probe according to claim 5, wherein the back side of the piezoelectric ceramic is connected to a control circuit by wire bonding, and a front side of the piezoelectric ceramic coupled to the membrane wall of the protective tube is connected to the ground.

9. A downhole production logging tool used to count solid particles in a fluid present in a hydrocarbon well, the tool being adapted for displacement along and within the hydrocarbon well comprising multiple downhole local solid particles counting probes; each downhole local solid particles counting probe for counting solid particles in the fluid comprising:

an elongated and flexible protective tube defining an internal cavity terminating by a membrane wall defining a tip, the protective tube and the membrane wall isolating the internal cavity from the fluid of the hydrocarbon well, the protective tube and membrane wall are made of metal or metal alloy and have a thickness such as to resist to a downhole hydrocarbon well pressure;

a passive acoustic sensor mounted inside the internal cavity, the passive acoustic sensor having a front side mechanically coupled on the membrane wall of the tip;

a characteristic dimension of the passive acoustic sensor being similar to solid particles average characteristic dimension, ranging from 0.5 mm to 1.5 mm, and a characteristic dimension of the membrane wall defining the tip ranges from 1 mm to 2 mm;

the passive acoustic sensor being arranged to detect acoustic waves generated by solid particles impacting the membrane wall defining the tip so as to resolve an individual impact from a single solid particle and to produce a signal representative of a count of solid particles;

wherein said downhole local solid particles counting probes are angularly distributed as an array around a cylindrical housing of the tool.

10. The tool of claim 9, further comprising a centralizer having multiple deploying arms, at least a part of the multiple deploying arms being fitted with said downhole local solid particles counting probes, the elongated and flexible protective tube being mounted on at least one deploying arm of the centralizer such as to follow movements of the centralizer.

11. A method of investigating sand entry in a hydrocarbon well in production to identify zones of the hydrocarbon well responsible for sand entry by moving a downhole logging tool used to count solid particles in a fluid present in the hydrocarbon well along the hydrocarbon well within the fluid using a wireline or a slick line, wherein solid particles are sand grains, the downhole logging tool comprising multiple downhole local solid particles counting probes being displaced along and within the hydrocarbon well; each downhole local solid particles counting probe for counting solid particles in the fluid comprising:

an elongated and flexible protective tube defining an internal cavity terminating by a membrane wall defining a tip, the protective tube and the membrane wall isolating the internal cavity from the fluid of the hydrocarbon well, the protective tube and membrane wall are made of metal or metal alloy and have a thickness such as to resist to a downhole hydrocarbon well pressure;

a passive acoustic sensor mounted inside the internal cavity, the passive acoustic sensor having a front side mechanically coupled on the membrane wall of the tip;

a characteristic dimension of the passive acoustic sensor being similar to solid particles average characteristic dimension, ranging from 0.5 mm to 1.5 mm, and a characteristic dimension of the membrane wall defining the tip ranges from 1 mm to 2 mm;

the passive acoustic sensor being arranged to detect acoustic waves generated by solid particles impacting the membrane wall defining the tip so as to resolve an individual impact from a single solid particle and to produce a signal representative of a number of solid particles being sand grains;

said downhole local solid particles counting probes being angularly distributed as an array around a cylindrical housing of the tool;

wherein the method comprising counting a number of sand grains impacting any of the probes over a defined threshold, said threshold being related to sand entry, and positioning a corresponding zone of the hydrocarbon well responsible for sand entry.

\* \* \* \* \*